US010641633B2

(12) United States Patent
Schollenberger et al.

(10) Patent No.: US 10,641,633 B2
(45) Date of Patent: May 5, 2020

(54) FLOWMETER MEASUREMENT CONFIDENCE DETERMINATION DEVICES AND METHODS

(71) Applicant: Micro Motion, Inc., Boulder, CO (US)

(72) Inventors: Frederick Scott Schollenberger, Boulder, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 253 days.

(21) Appl. No.: 15/548,667

(22) PCT Filed: Jan. 6, 2016

(86) PCT No.: PCT/US2016/012318
§ 371 (c)(1),
(2) Date: Aug. 3, 2017

(87) PCT Pub. No.: WO2016/140733
PCT Pub. Date: Sep. 9, 2016

(65) Prior Publication Data
US 2018/0003538 A1    Jan. 4, 2018

Related U.S. Application Data

(60) Provisional application No. 62/128,272, filed on Mar. 4, 2015.

(51) Int. Cl.
*G01F 15/02* (2006.01)
*G01F 1/74* (2006.01)
*G01F 1/84* (2006.01)

(52) U.S. Cl.
CPC .............. *G01F 15/024* (2013.01); *G01F 1/74* (2013.01); *G01F 1/84* (2013.01); *G01F 1/8431* (2013.01); *G01F 1/8436* (2013.01); *G01F 1/8472* (2013.01)

(58) Field of Classification Search
CPC ........ G01F 1/74; G01F 1/8431; G01F 1/8436; G01F 1/8472; G01F 15/024
See application file for complete search history.

(56) References Cited

U.S. PATENT DOCUMENTS

| 4,876,897 A * | 10/1989 | DeCarlo ................... G01F 1/32 |
| | | 73/861.04 |
| 6,327,914 B1 * | 12/2001 | Dutton .................. G01F 1/8413 |
| | | 73/32 A |
| 6,405,604 B1 * | 6/2002 | Berard ..................... G01F 1/74 |
| | | 73/861.04 |
| 2001/0045134 A1 * | 11/2001 | Henry ...................... G01F 1/74 |
| | | 73/861.356 |
| 2002/0033043 A1 | 3/2002 | Dutton et al. |

(Continued)

FOREIGN PATENT DOCUMENTS

EP      1845346 A2    10/2007
WO    2009102317 A1    8/2009
(Continued)

*Primary Examiner* — David J Bolduc
(74) *Attorney, Agent, or Firm* — The Ollila Law Group LLC

(57) ABSTRACT

A method for operating a vibratory flowmeter (5) is provided. The method includes placing a process fluid in the vibratory meter (5) and measuring entrained gas in the process fluid. A measurement confidence level is determined for at least one operating variable.

18 Claims, 6 Drawing Sheets

(56) References Cited

U.S. PATENT DOCUMENTS

| | | | |
|---|---|---|---|
| 2004/0206189 A1 | 10/2004 | Henry et al. | |
| 2005/0044929 A1* | 3/2005 | Gysling | G01F 1/74 73/32 A |
| 2005/0061060 A1* | 3/2005 | Gysling | G01F 1/74 73/32 A |
| 2005/0159904 A1* | 7/2005 | Loose | G01F 1/666 702/45 |
| 2005/0193832 A1 | 9/2005 | Tombs et al. | |
| 2006/0169058 A1* | 8/2006 | Gysling | G01F 1/7082 73/861.355 |
| 2007/0198221 A1* | 8/2007 | James | G01F 15/063 702/187 |
| 2008/0011101 A1 | 1/2008 | Storm | |
| 2008/0184813 A1* | 8/2008 | Patten | G01F 1/8413 73/861.355 |
| 2008/0223148 A1* | 9/2008 | Cunningham | G01F 1/8413 73/861.356 |
| 2010/0170322 A1* | 7/2010 | Van Cleve | G01F 1/74 73/1.16 |
| 2011/0264385 A1* | 10/2011 | Weinstein | G01F 1/8436 702/48 |
| 2011/0301877 A1* | 12/2011 | Wee | G01F 1/363 702/47 |
| 2013/0174668 A1* | 7/2013 | Baker | G01F 1/44 73/861.04 |
| 2013/0199306 A1* | 8/2013 | Kolahi | G01F 1/74 73/861.355 |
| 2014/0224006 A1* | 8/2014 | Scott | E21B 49/00 73/152.18 |
| 2015/0268082 A1* | 9/2015 | Kirst | G01F 25/0007 73/861.357 |
| 2016/0076926 A1* | 3/2016 | McCann | G01N 33/2823 73/152.29 |
| 2016/0091358 A1* | 3/2016 | Fraser | G01F 25/0007 73/1.16 |
| 2016/0245074 A1* | 8/2016 | Schollenberger | E21B 47/10 |

FOREIGN PATENT DOCUMENTS

| | | |
|---|---|---|
| WO | 2011008307 A1 | 1/2011 |
| WO | 2011008308 A1 | 1/2011 |
| WO | 2012170020 A1 | 12/2012 |

* cited by examiner

| Drive Gain Threshold | GVF | Confidence |
|---|---|---|
| 0 - 50 | 0 - 5 | High |
| 50 - 100 | 0 - 5 | Medium |
| 0 - 50 | > 5 | Medium |
| 50 - 100 | > 5 | Low |
| > 100 | Any | Low |

FIG. 6

| Drive Gain Threshold | GVF | Flow Rate | Confidence |
|---|---|---|---|
| 0 - 50 | 0 - 5 | Within Range | High |
| 0 - 50 | 0 - 5 | Low | Medium-high |
| 50 - 100 | 0 - 5 | Within Range | Medium |
| 50 - 100 | 0 - 5 | Low | Low |
| 0 - 50 | > 5 | Within Range | Medium |
| 0 - 50 | > 5 | Low | Low |
| 50 - 100 | > 5 | Any | Low |
| > 100 | Any | Any | Low |

FIG. 7

FLOWMETER MEASUREMENT CONFIDENCE DETERMINATION DEVICES AND METHODS

FIELD OF THE INVENTION

The present invention relates to flowmeter devices and methods, and more particularly, to flowmeter devices and methods for determining the confidence or predicted accuracy of measurements.

BACKGROUND

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits (also called flow tubes) that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by a driver, e.g., an electromechanical device, such as a voice coil-type actuator, that perturbs the conduit in a periodic fashion. Mass flow rate may be determined by measuring time delay or phase differences between motions at the transducer locations. Two or more such transducers (or pickoff sensors) are typically employed in order to measure a vibrational response of the flow conduits, and are typically located at positions upstream and downstream of the driver. Instrumentation receives signals from the pickoff sensors and processes the signals in order to derive a mass flow rate measurement.

Flowmeters may be used to perform mass flow rate measurements for a wide variety of fluid flows. One area in which Coriolis flowmeters can potentially be used is in the metering of oil and gas wells. The product of such wells can comprise a multiphase flow, including the oil or gas, but also including other components, including water and air, for example, and/or solids. It is, of course, highly desirable that the resulting metering be as accurate as possible, even for such multiphase flows.

Coriolis meters offer high accuracy for single phase flows. However, when a Coriolis flowmeter is used to measure aerated fluids or fluids including entrained gas, the accuracy of the meter can be significantly degraded. This is similarly true for flows having entrained solids and for mixed-phase fluid flows, such as when hydrocarbon fluids contain water.

Entrained gas is commonly present as bubbles in the flow material. The size of the bubbles can vary, depending on the amount of air present, the flow rate of the flow material, and other factors. A related and significant source of error arises from fluid decoupling. Fluid decoupling results from the motion of the gas bubbles with respect to the liquid as a result of the vibration of the tube. The relative motion of the gas bubbles with respect to the liquid is driven by a buoyant force that is similar to the force that causes bubbles to rise to the surface under the influence of gravity. However, in a vibrating tube, it is the acceleration of the vibrating tube that causes the bubbles to move more than the acceleration of gravity. Because the dense fluid has more mass than the light bubbles, the bubbles have greater acceleration than the fluid in the direction of the tube acceleration. Due to the greater acceleration of the bubbles, on each oscillation of the flow conduit, the bubbles move further than the flow conduit. This is the basis of the decoupling problem. As a result, the fluid that has the lower vibrational amplitude undergoes less Coriolis acceleration and imparts less Coriolis force on the flow conduit than it would in the absence of bubbles. This results in the flow rate and density characteristics being under-reported (negative flow and density errors) when entrained gas is present. Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. Another influence on bubble mobility is the bubble size. The drag on a bubble is proportional to the surface area, whereas the buoyant force is proportional to the volume. Therefore, very small bubbles have a high drag to buoyancy ratio and tend to move with the fluid. Small bubbles subsequently cause small errors. Conversely, large bubbles tend not to move with the fluid and result in large errors. The same holds true for particles. Small particles tend to move with the fluid and cause small errors.

The density difference between the fluid and the gas is another factor that may contribute to flowmeter inaccuracy. The buoyant force is proportional to the difference in density between the fluid and the gas. A high pressure gas can have a high enough density to affect the buoyant force and reduce the decoupling effect.

In addition to measurement errors, the effect of multiphase flow on Coriolis meters is an increased damping on the flow conduit, resulting in the diminishment of flow conduit vibratory amplitude. Typically, meter electronics compensate for this diminished amplitude by increasing the drive energy, or drive gain, in order to restore the amplitude. To correct for errors due to multi-phase flow, measured variables including density, mass flow, and volume flow are used from a period of single phase flow (liquid only)—these values are referred to as hold values. Hold values are used during two phase flow to replace or improve the accuracy of measured variables. Currently, hold values are determined at a user specified point in time before a parameter goes above a threshold.

Overall, multiphase applications particularly involve an extremely variable amount and behavior of entrained gas and thus exhibit variable measurement performance. Methods have been developed that reduce errors, but there are limitations, and certain types of conditions are more or less effectively handled by prior art methods. By understanding how these various methods work (i.e. sampling, interpolation, etc.), and by relying on the same or similar diagnostics (i.e. drive gain, density) used to create it, it is possible to determine how well the method is working and thus how severe, at least qualitatively, decoupling and other multiphase errors should be.

Indicating measurement confidence or a predicted qualitative accuracy level has benefits to both manufacturers and their customers. Outputting a confidence factor helps to set customer expectations for accuracy on each flowmeter, thus leading to more productive comparisons to separators and other references. Secondly, the confidence indicator tells customers which meters they can fully rely upon and which flowmeters should only be used for estimations or trends. For example, in a hypothetical field of 100 oil wells, 50 might have no gas and can be used with normal meter specifications in mind (i.e. 0.1% error), 30 might have mild gas, and 20 might have severe gas. Those 20 "severe" cases can either be used for trend prediction, or could potentially be removed in favor of another technology if accuracy is critical in that location.

Finally, a confidence factor can also be used to make decisions about optimizing production or measurement accuracy. Turning back to the above hypothetical, if measurement accuracy is highly important on a particular well due to lease allocation, the operator might choose to increase choke pressure or take other operational steps to reduce the amount of gas and improve measurement confidence at that location.

There thus remains a need in the art for a vibratory flowmeter that provides a confidence or accuracy predictor. There remains a need in the art for a vibratory flowmeter that provides a confidence or accuracy predictor in dealing with multiphase flow. Embodiments herein provide methods and devices used to calculate and provide a confidence indicator.

SUMMARY OF THE INVENTION

A method for operating a vibratory flowmeter is provided according to an embodiment. The method comprises placing a process fluid in the vibratory meter and measuring entrained gas in the process fluid. A measurement confidence level of at least one operating variable is then determined.

Meter electronics for a flowmeter configured to receive a process fluid is provided according to an embodiment. The meter electronics comprises an interface configured to communicate with a flowmeter assembly of the flowmeter, and receive a vibrational response, and a processing system coupled to the interface. The processing system comprises a measurement confidence routine configured to measure an entrained gas in the process fluid and determine a measurement confidence level of at least one operating variable.

Aspects of the Invention

According to an aspect, a method for operating a vibratory flowmeter comprises placing a process fluid in the vibratory meter, measuring entrained gas in the process fluid, and determining a measurement confidence level of at least one operating variable.

Preferably, the step of measuring entrained gas in the process fluid comprises determining a drive gain threshold.

Preferably, the step of determining a drive gain threshold comprises measuring drive gain signal over a predetermined time period.

Preferably, the step of measuring entrained gas in the process fluid comprises detecting periods of time comprising minimum entrained gas in the process fluid, and wherein the measurement confidence level is lowered if the drive gain threshold during these periods is above a predetermined threshold.

Preferably, the method comprises the step of recording at least one hold value during the periods of time having low to no entrained gas in the process fluid.

Preferably, the at least one hold value comprises at least one of a flow rate and a density of the process fluid.

Preferably, the method comprises the step of measuring entrained gas in the process fluid and comprises detecting a severity of gas slugs in the process fluid, and wherein the measurement confidence level is lowered if the severity of gas slugs is above a predetermined threshold.

Preferably, the method comprises the steps of measuring a flow rate of the process fluid and lowering the measurement confidence level if the measured flow rate is below a predetermined threshold.

Preferably, the method comprises the steps of measuring a time interval between process fluid entrained gas measurements, and lowering the measurement confidence level if the time interval is greater than a predetermined amount.

Preferably, the method comprises the steps of recording a plurality of hold values, and lowering the measurement confidence level if a standard deviation of the plurality of hold values is greater than a predetermined threshold.

According to an aspect, meter electronics for a flowmeter is configured to receive a process fluid. The meter electronics comprises an interface configured to communicate with a flowmeter assembly of the flowmeter, and receive a vibrational response, and a processing system coupled to the interface. The processing system comprises: a measurement confidence routine configured to measure an entrained gas in the process fluid, and determine a measurement confidence level of at least one operating variable.

Preferably, measuring entrained gas in the process fluid comprises determining a drive gain threshold.

Preferably, determining a drive gain threshold comprises measuring drive gain signal over a predetermined time period.

Preferably, the meter electronics is configured to detect periods of time comprising minimum entrained gas in the process fluid, and wherein the measurement confidence level is lowered if the drive gain threshold during these periods is above a predetermined level.

Preferably, the measurement confidence routine is configured to record at least one hold value during the periods of time having low to no entrained gas in the process fluid.

Preferably, the at least one hold value comprises at least one of a flow rate and a density of the process fluid.

Preferably, measuring entrained gas in the process fluid comprises detecting a severity of gas slugs in the process fluid, and wherein the measurement confidence level is lowered if the severity of gas slugs is above a predetermined threshold.

Preferably, the measurement confidence routine is configured to measure a flow rate of the process fluid, and lower the measurement confidence level if the measured flow rate is below a predetermined threshold.

Preferably, the measurement confidence routine is configured to measure a time interval between process fluid entrained gas measurements, and lower the measurement confidence level if the time interval is greater than a predetermined amount.

Preferably, the measurement confidence routine is configured to record a plurality of hold values, and lower the measurement confidence level if a standard deviation of the plurality of hold values is greater than a predetermined threshold.

BRIEF DESCRIPTION OF THE DRAWINGS

FIG. 6 is a sample table for aiding in determining a flowmeter confidence level.

FIG. 7 is another sample table for aiding in determining a flowmeter confidence level.

DETAILED DESCRIPTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
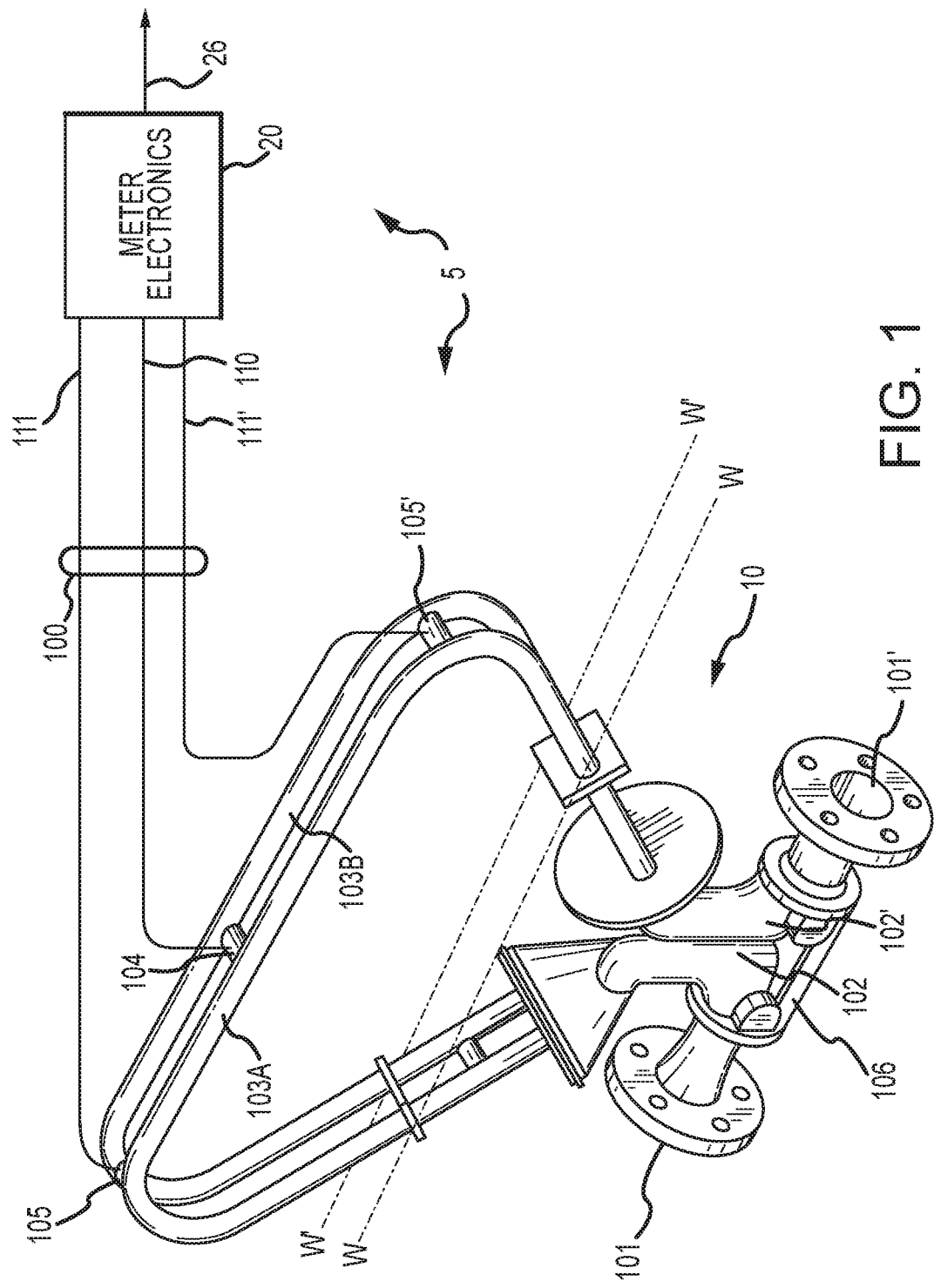
FIG. 1 shows a flowmeter comprising a meter assembly and meter electronics.

FIG. 1 shows a flowmeter 5 according an embodiment. The flowmeter 5 comprises a sensor assembly 10 and meter electronics 20. The meter electronics 20 is connected to the sensor assembly 10 via leads 100 and is configured to provide measurements of one or more of a density, mass flow rate, volume flow rate, totalized mass flow, temperature, or other measurements or information over a communication path 26. The flowmeter 5 can comprise a Coriolis mass flowmeter. It should be apparent to those skilled in the art that the flowmeter 5 can comprise any manner of flowmeter 5, regardless of the number of drivers, pick-off sensors, flow conduits, or the operating mode of vibration.

The sensor assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106 in some embodiments. The spacer 106 maintains the spacing between the manifolds 102 and 102'. When the sensor assembly 10 is inserted into a pipeline (not shown) which carries the process fluid being measured, the process fluid enters the sensor assembly 10 through the flange 101, passes through the inlet manifold 102 where the total amount of process fluid is directed to enter the flow conduits 103A and 103B, flows through the flow conduits 103A and 103B and back into the outlet manifold 102', where it exits the meter assembly 10 through the flange 101'.

The process fluid can comprise a liquid. The process fluid can comprise a gas. The process fluid can comprise a multi-phase fluid, such as a liquid including entrained gases and/or entrained solids. The flow conduits 103A and 103B are selected and appropriately mounted to the inlet manifold 102 and to the outlet manifold 102' so as to have substantially the same mass distribution, moments of inertia, and elastic moduli about the bending axes W-W and W'-W', respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the vibratory flowmeter 5. The driver 104 may comprise one of many well-known arrangements, such as a magnet mounted to the flow conduit 103A and an opposing coil mounted to the flow conduit 103B. An alternating current is passed through the opposing coil to cause both conduits to oscillate. A suitable drive signal is applied by the meter electronics 20 to the driver 104 via lead 110. Other driver devices are contemplated and are within the scope of the description and claims.

The meter electronics 20 receives sensor signals on the leads 111 and 111', respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things. The communication path 26 provides an input and an output means that allows the meter electronics 20 to interface with an operator or with other electronic systems. The description of FIG. 1 is provided merely as an example of the operation of a flowmeter and is not intended to limit the teaching of the present invention.

The meter electronics 20 in one embodiment is configured to vibrate the flow conduit 103A and 103B. The vibration is performed by the driver 104. The meter electronics 20 further receives resulting vibrational signals from the pickoff sensors 105 and 105'. The vibrational signals comprise a vibrational response of the flow conduits 103A and 103B. The meter electronics 20 processes the vibrational response and determines a response frequency and/or phase difference. The meter electronics 20 processes the vibrational response and determines one or more flow measurements, including a mass flow rate and/or density of the process fluid. Other vibrational response characteristics and/or flow measurements are contemplated and are within the scope of the description and claims.

In one embodiment, the flow conduits 103A and 103B comprise substantially U-shaped flow conduits, as shown. Alternatively, in other embodiments, the wellhead measurement device can comprise substantially straight flow conduits. Additional flowmeter shapes and/or configurations can be used and are within the scope of the description and claims.

Figure 2:
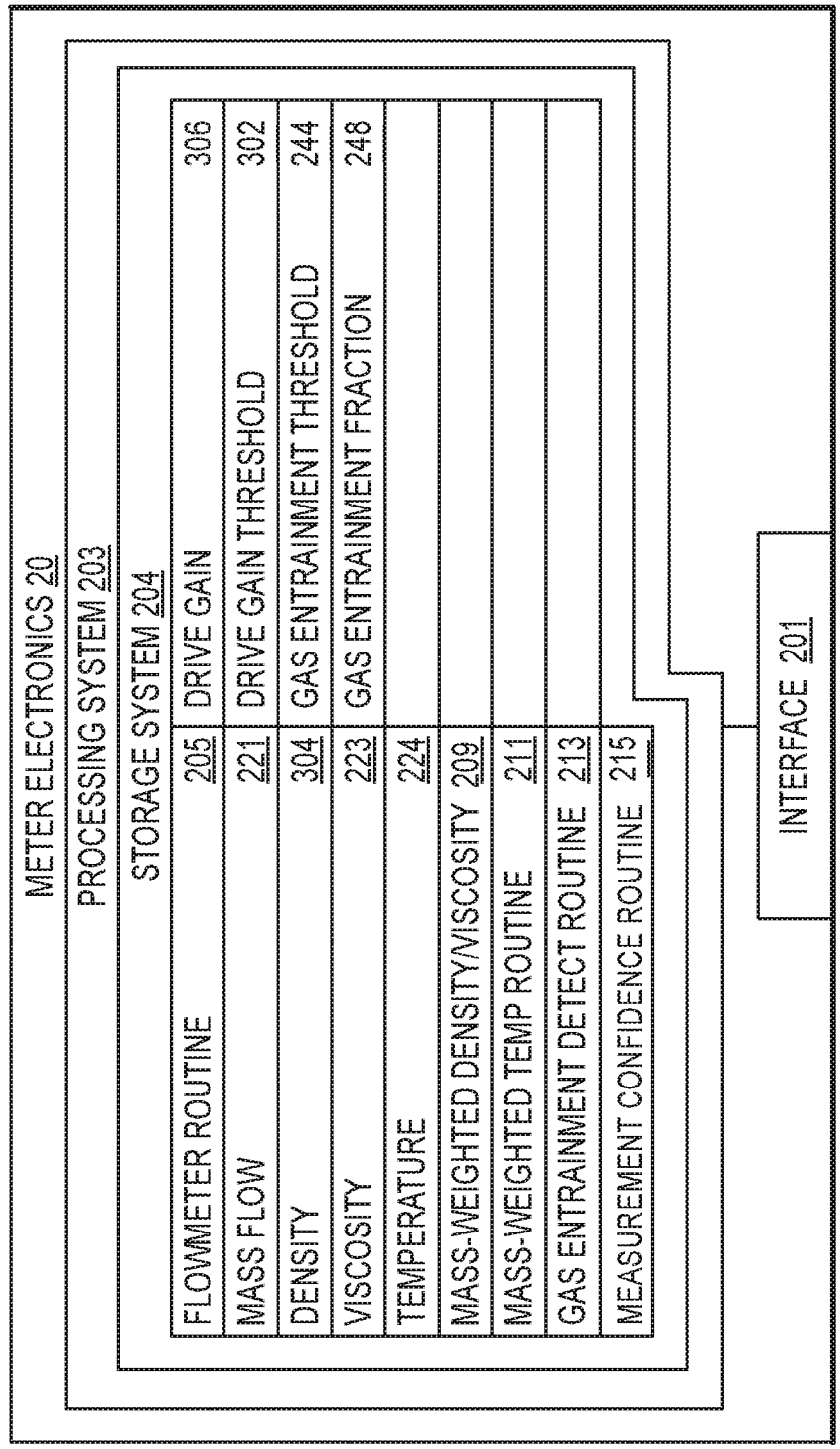
FIG. 2 shows a block diagram of the meter electronics according to an embodiment.

FIG. 2 is a block diagram of the meter electronics 20 of flowmeter 5 according to an embodiment. In operation, the flowmeter 5 provides various measurement values that may be outputted including one or more of a measured or averaged value of water cut, mass flow rate, volume flow rate, individual flow component mass and volume flow rates, and total flow rate, including, for example, both volume and mass flow.

The flowmeter 5 generates a vibrational response. The vibrational response is received and processed by the meter electronics 20 to generate one or more fluid measurement values. The values can be monitored, recorded, totaled, and output.

The meter electronics 20 includes an interface 201, a processing system 203 in communication with the interface 201, and a storage system 204 in communication with the processing system 203. Although these components are shown as distinct blocks, it should be understood that the meter electronics 20 can be comprised of various combinations of integrated and/or discrete components.

The interface 201 is configured to communicate with the sensor assembly 10 of the flowmeter 5. The interface 201 may be configured to couple to the leads 100 (see FIG. 1) and exchange signals with the driver 104 and the pickoff sensors 105 and 105'. The interface 201 may be further configured to communicate over the communication path 26, such as to external devices.

The processing system 203 can comprise any manner of processing system. The processing system 203 is configured to retrieve and execute stored routines in order to operate the flowmeter 5. The storage system 204 can store routines including a flowmeter routine 205, a mass-weighted density/viscosity routine 209, a mass-weighted temperature routine 211, a gas entrainment detect routine 213, and a measurement confidence routine 215. Other measurement/processing routines are contemplated and are within the scope of the description and claims. The storage system 204 can store measurements, received values, working values, and other information. In some embodiments, the storage system stores a mass flow ($\dot{m}$) 221, a density ($\rho$) 304, a viscosity ($\mu$) 223, a temperature (T) 224, a drive gain 306, a drive gain threshold 302, a gas entrainment threshold 244, and a gas entrainment fraction 248.

The flowmeter routine 205 can produce and store fluid quantifications and flow measurements. These values can comprise substantially instantaneous measurement values or can comprise totaled or accumulated values. For example, the flowmeter routine 205 can generate mass flow measurements and store them in the mass flow storage 221 of the system storage 204, for example. The flowmeter routine 205 can generate density measurements and store them in the density storage 304, for example. The mass flow and density values are determined from the vibrational response, as previously discussed and as known in the art. The mass flow and other measurements can comprise a substantially instantaneous value, can comprise a sample, can comprise an averaged value over a time interval, or can comprise an accumulated value over a time interval. The time interval may be chosen to correspond to a block of time during which certain fluid conditions are detected, for example a liquid-only fluid state, or alternatively, a fluid state including liquids and entrained gas. In addition, other mass flow and related quantifications are contemplated and are within the scope of the description and claims.

In flow conditions where no gas is present, the mixture volume flow rate is equal to the liquid volume flow rate. At times when a drive gain is low and stable, gas is not present in the pipeline and all measurements may be assumed to be accurate within normal flowmeter specifications. Many fluid sources involve only intermittent entrained gas, and over the course of an hour or day or other predetermined period of time, it is likely a time interval exists where little or no gas is present. During this time, the drive gain is low and stable, and flow rate, density, and any other measurements made by the meter may be trusted and output to the user or recorded for statistical analysis. This would allow an accurate determination of component flow rates at that period of low drive gain, for example without limitation. Since these illustrative situations may occur over time for a single source of fluid, it is important to note a flowmeter's 5 measurement confidence so that measurements may be trusted, used merely as an estimate, or otherwise ignored.

Various methods are used to mitigate error in applications with intermittent gas slugs. Ideally, there is no gas and very accurate measurements are possible, but this is not always the case. As the gas volume fraction in the process fluid increases, the accuracy of the measurement decreases. The accuracy of these methods depend on various factors, thus the confidence indicator output is determined using a combination of these factors.

According to the embodiments, a number of factors may be utilized to determine measurement confidence. In particular, the existence of periods of time with low or no gas from which hold values are determined, may aid in determining measurement confidence. Drive gain is utilized as the signal that indicates the presence of entrained gas in the process fluid flow. A drive gain threshold may be used to distinguish between periods of relatively high and low gas levels. It should be noted that, for purposes of the embodiments provided herein, that the term drive gain may, in some embodiments, refer to drive current, pickoff voltage, or any signal measured or derived that indicates the amount of power needed to drive the flow conduits 103A, 103B at a particular amplitude. In related embodiments, the term drive gain may be expanded to encompass any metric utilized to detect multi-phase flow, such as noise levels, standard deviation of signals, damping-related measurements, and any other means known in the art to detect multi-phase flow. During periods of high gas, corrective action is taken to improve the accuracy of the measured values. Thus, when drive gain is above this threshold, the meter operates in a corrective state. Hold values (measured variables utilized from a period of low to no gas) for any of density, volume flow rate, and mass flow rate from periods of low drive gain 306 (drive gain 306 below the drive gain threshold 302) may therefore be utilized during the corrective state so to replace or improve the accuracy of measured variables. Because flow rates and density can change over time, hold values must be periodically updated. Thus, it is more beneficial to measure accurate values only occasionally than to frequently take measurements that exhibit large errors. However, if periods with no gas do not exist, then the drive gain threshold must be increased so that a new hold value is created. The greater the drive gain threshold needed to create a hold value, or in other words, the more gas that exists during the creation of the hold value, then the lower the accuracy of that hold value and measurement created from using the hold value.

Another, albeit related, variable for determining the confidence level is the "severity" of gas slugs, which is also utilized in embodiments. Even during time periods in which hold values remain constant, meter electronics 20 still rely on the accuracy of other real-time measurement values, which are more accurate when gas volume flow (GVF) is low. For example, some methods hold volume flow rate constant during gas slugs, but rely on the real-time density value to calculate GVF and thus determine the total liquid portion of volume flow. In this context, gas slugs or slugging refers to the difference in GVF between periods of high and low gas. For example, if a gas slug has a high GVF and the periods before and after the gas slug have low or no GVF, then the gas slugging is considered severe. However, if the periods before or after the gas slug have the same or close to the same GVF as the gas slug, then there is no slugging or the slugging is considered non-severe. It should be noted that cases of no slugging do not infer that there is no gas, or that measurements are trustworthy. No slugging indicates that GVF is constant regardless of its value. Also note that low gas periods refer to periods of minimum gas in the flowmeter 5. Additionally, minimum gas periods do not necessarily mean low gas volume fraction, but rather periods in time where GVF is low relative to other times. Hold values are determined from low gas periods regardless of the GVF in the low gas periods. It should also be noted that terms like low, high, severe, etc. will be understood by those skilled in the art, as flowmeter construction differs between models and process conditions vary between (and within) applications, so absolute values associated with such terms are specific to the particular flowmeter used in a particular application.

Yet another variable for determining the confidence level is the flow rate of the process fluid. Flow rate can have a large effect on the measured mass flow rate accuracy. At a given GVF, say 5% for example without limitation, the accuracy of the measured mass flow rate will vary greatly depending on what the true mass flow rate is. If the true mass flow rate is high, near the nominal flow rate of the meter, then for a GVF of 5% there will be little error on the measured mass flow rate, say +/−1%. However, if for the same meter and GVF the true flow rate is much lower, the error for the measured mass flow rate will be higher.

Another variable that may be used in confidence level determination may be the "recentness" of data. In an embodiment, the preference is to favor recent data versus older data in order to promote accurate measurements. A long period of time between low GVF hold values may, in an embodiment, promote a lower confidence. Similarly, if a long time period has lapsed since the last captured hold value, a lower confidence may be reported. Since drive gain is utilized as the signal that indicates the presence of entrained gas in the process fluid flow, drive gain is periodically measured. In an embodiment, recent drive gain measurements are favored and/or weighted against less recent measurements. Similarly, a drive gain threshold used to distinguish between periods of relatively high and low gas levels may be updated/recalculated periodically, and more recent drive gain measurements are preferentially utilized when adjusting the drive gain threshold. Since during periods of high gas, corrective action is taken to improve the accuracy of measured values, utilizing recent data over older data makes it more likely that the corrective action taken and/or the confidence level reported is based upon data that is considered most relevant.

In an embodiment, confidence is determined using various combinations of meter values including those discussed above. In particular embodiments, confidence may be a numerical percentile. In other embodiments, a more qualitative approach may be taken. For example, qualitative ratings may be simple "high," "medium," and "low" indications. In an embodiment, qualitative ratings may be:

High Confidence: In this case, low gas periods contain little to no gas and the gas slug severity is low. Therefore, hold values are accurate as they are determined from periods of no gas. Additionally, the "high gas" or "slug" periods that are being corrected using the hold values also contain little gas which helps mitigate any errors in the correction methods.

Medium Confidence: Here, low gas periods contain little to no gas, but the gas slug severity is high. In this case the hold values are accurate. However, an error in the correction method will be incurred due to the high GVF in the high gas periods due to the required use of real-time measurement during interpolated portions.

Low Confidence: These cases present low gas periods that still have a have high GVF. Regardless of the gas slug severity, the measurement will be inaccurate because the hold values will be inaccurate.

Figure 3:
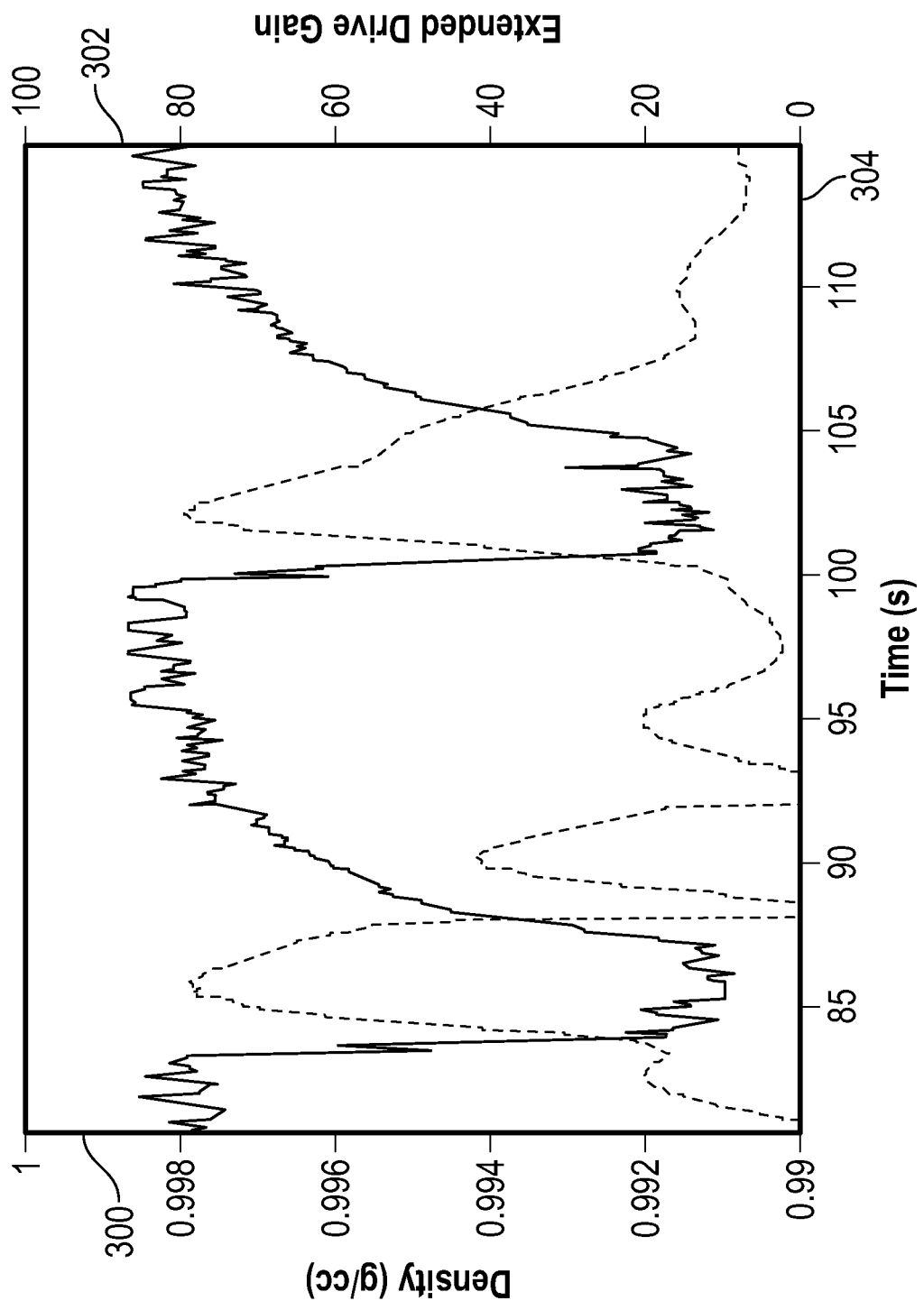
FIG. 3 is a graph illustrating an example period of high flowmeter confidence.
Figure 4:
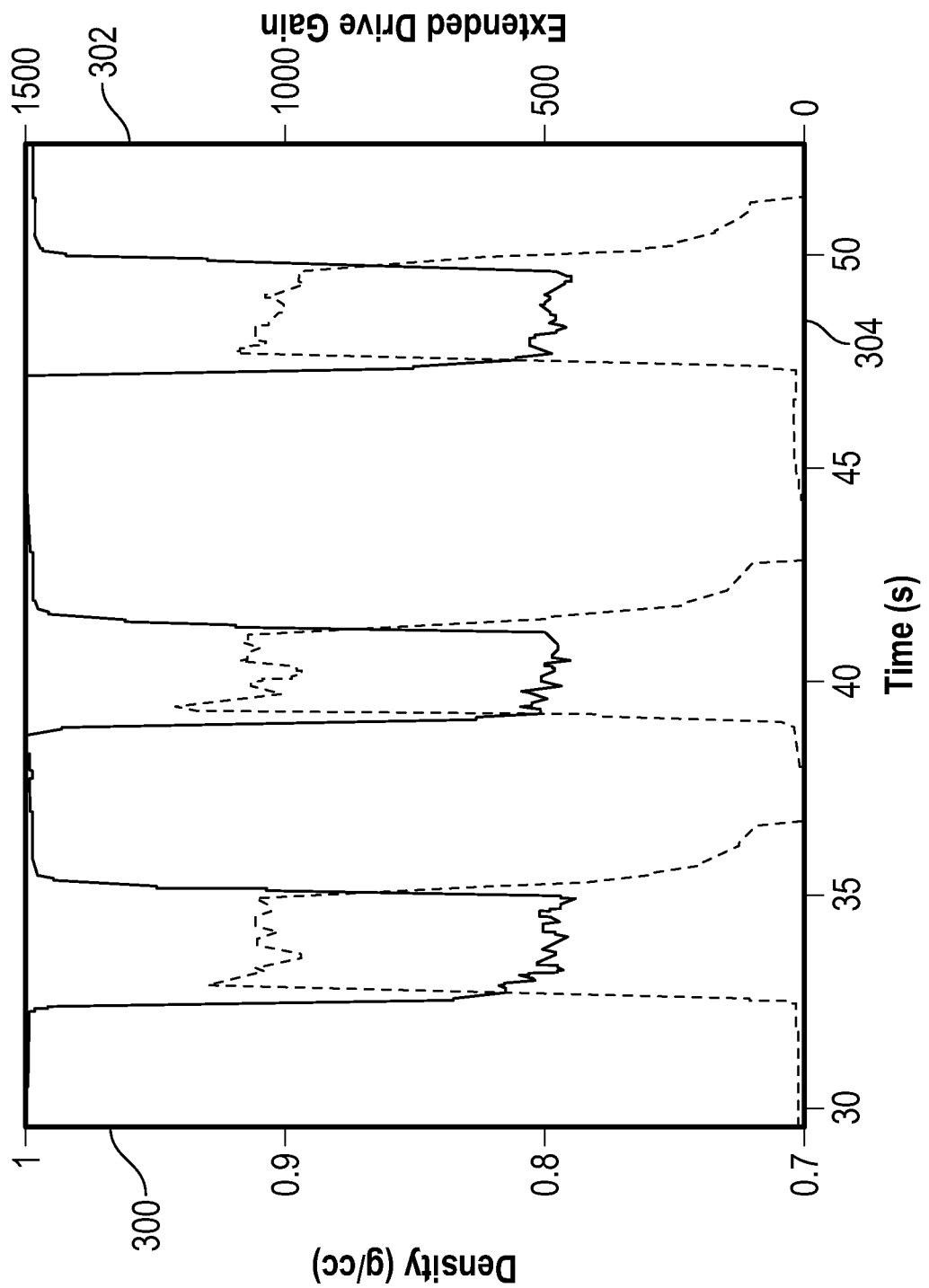
FIG. 4 is a graph illustrating an example period of medium flowmeter confidence.
Figure 5:
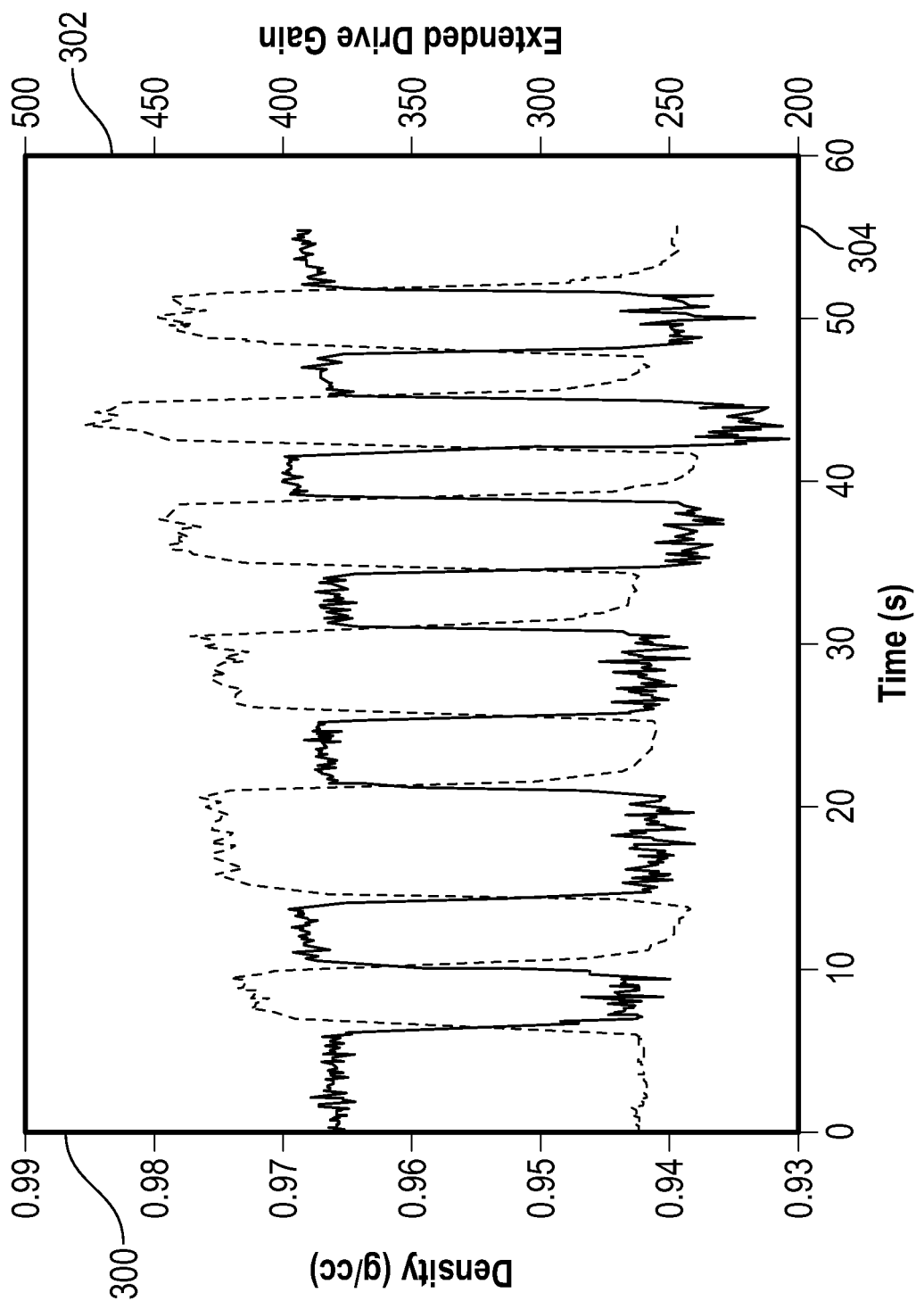
FIG. 5 is a graph illustrating an example period of low flowmeter confidence.

FIGS. 3-5 represent examples of periods of high, medium, and low confidence. Density is plotted referring to the left y-axis 300, extended drive gain is noted by the right y-axis 302, and time is plotted with reference to the x-axis 304. Extended drive gain is drive gain if it were allowed to go above 100%. The solid traces represent density, and the dashed traces represent extended drive gain.

FIG. 3 represents an example case of high confidence in the measurement value(s), specifically, low severity slugs with low GVF during low gas periods. In this example, non-severe gas slugging is indicated by the small changes in density between the high and low periods of gas (~0.5% change). Additionally, the drive gain is low during the minimum gas periods which would result in a low drive gain threshold, which indicates low GVF during these periods and thus accurate capture of hold values.

FIG. 4 represents an example case of medium confidence in the measurement value(s). Here, high-severity slugs are exhibited with low GVF during low gas periods. High severity is indicated by the large density swings between the low and high GVF periods (~20% change). However during the low gas periods, drive gain is low indicating low GVF. This yields hold values having high accuracy.

FIG. 5 represents an example case of low confidence in the measurement value(s)—specifically, low severity slugs with high GVF during low gas periods. Low slug severity is indicated by the small changes in density between the low and high gas periods (~2% change). However, during the low gas periods, drive gain is still high (~250%), which results in a high drive gain threshold, thus indicating a high GVF. The hold values determined during the low periods would be in error, thus causing the corrective state to be in error as well. Though not shown, high severity slugs with high GVF during low gas periods would also result in low confidence. As noted above, newer data/measurements may, in an embodiment, be preferentially utilized over older data. Thus, the more outdated data present due to extended periods of high gas, the lower the confidence reported.

In an embodiment, GVF during the high gas periods is estimated using the following equation, as an example, without limitation:

$$GVF = \frac{\rho_{mix} - \rho_{liq}}{\rho_{gas} - \rho_{liq}} \quad (1)$$

Where:
$\rho_m$, is the mixture (gas and liquid) density, which is the measured density in the presence of gas;
$\rho_{liq}$ is the held liquid density from a low gas period; and
$\rho_{gas}$ is the gas density.

If, during a gas slug the true GVF is high, the estimation of liquid volume flow during a corrective state will be in greater error. The measured mass flow rate, which is assumed to be accurate, will be less accurate if GVF is high. Because of this, the confidence in the overall measurement goes down even though the hold values might be determined from periods of no gas.

It should be noted that equation (1) cannot be used to estimate the GVF during low gas periods from which hold values are determined because meter electronics 20 makes the assumption that $\rho_{mix} = \rho_{liq}$ during low GVF periods. Consequently, prior art methods estimate GVF as 0 when not in a corrective state. In an embodiment, the drive gain threshold is used to estimate the gas content in the low gas periods. The drive gain threshold may be preset, or may be based off of recorded drive gains during periods of minimum and/or no gas. If the drive gain during these periods is low, then the GVF during these periods is low as well. However if the drive gain threshold based off of minimum gas periods is high, then the GVF is high during the low gas periods. Thus, the drive gain threshold can give a rough estimate of gas presence, and can aid in predicting measurement confidence.

FIG. 6 illustrates the use of GVF and drive gain threshold levels, while FIG. 7 illustrates the use of GVF, drive gain threshold levels, and flow levels in determining discrete confidence levels. It should be noted that the numerical values are simply examples and necessarily differ based on various parameters including flowmeter model, size, application, environment, etc. The values for GVF and drive gain threshold that define the level of confidence are determined depending on the particular flowmeter, application conditions, and required accuracy. Though discrete confidence levels are illustrated, a continuous confidence spectrum may alternatively be employed.

At a given GVF, say 5% for example without limitation, the accuracy of the measured mass flow rate will vary greatly depending on what the true mass flow rate is. If the true mass flow rate is high, near the nominal flow rate of the meter, then for a GVF of 5% there will be little error on the measured mass flow rate (e.g. +/−1%). However, if for the same flowmeter 5 and GVF, the flow rate is appreciably lower than nominal flow rate, the error on the measured mass flow rate will be higher. There are various metrics that can be used to account for the variability introduced by low flow rates including meter turndown and the variance of mass flow rate hold values, for example.

Meter turndown is defined as the fraction of measured flow rate to nominal flow rate for a given meter size. Low flow rates during flow periods having entrained gas produce inaccurate results due to damping asymmetry from the inlet to the outlet of the flowmeter 5. This embodiment directly looks for low flow rates, and if found, lowers the confidence in the overall measurement.

The standard deviation of the hold values may also be an indicator of confidence based on flow rate. In the event of a low flow rate, the standard deviation of hold values will be high, thus indicating lower confidence. This method is more general in its approach and can account for other sources of variability besides just low flow rate.

As noted above, various meter values can be used to determine confidence levels. Both hold values and output variables can have associated confidence indicators.

Attributes utilized for determining accuracy of hold values include: drive gain-confidence decreases with increased drive gain; high standard deviation of recorded hold values decreases confidence; large changes in hold value compared with previous hold values decreases confidence; a drop in density hold value compared to previous density hold values decreases confidence; and mass/volume flow hold values that have a high turndown from nominal flow rate of meter decrease confidence.

Attributes utilized for determining accuracy of output variables include: high GVF during a corrective state decreases confidence; a drop in density versus the held density decreases confidence; large deviations in mass/volume flow from held mass/volume flow decrease confidence; a high standard deviation of any flow variables during a corrective state decreases confidence; and an increased drive gain during a corrected state decreases confidence.

Other indicators that may be utilized to estimate confidence include: high flow rate turndown during measurement decreases confidence; increased time spent in a corrective state without new hold values decreases confidence; and too much overall time spent in a corrective state decreases confidence.

Confidence may be updated at the same rate as any other output variable, or updated whenever a new hold value is calculated or when a new drive gain threshold is calculated. The update rate will depend on how confidence is defined. Confidence can also be averaged and output at discrete time intervals. Finally, confidence can be averaged and weighted based on the flow rate going through the meter. The flow rate used for flow averaging can either be the hold value or measured value.

The present description depicts specific examples to teach those skilled in the art how to make and use the best mode of the invention. For example, oil and gas wells are used for illustrative purposes, but the embodiments described herein are contemplated for use in any application of a fluid flow. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. A method for operating a vibratory flowmeter comprising:
    placing a process fluid in the vibratory meter;
    measuring entrained gas in the process fluid; and
    determining a measurement confidence level of at least one operating variable, wherein measuring entrained gas in the process fluid comprises detecting a severity of gas slugs in the process fluid, and wherein the measurement confidence level is lowered if the severity of gas slugs is above a predetermined threshold.

2. The method of claim 1, wherein measuring entrained gas in the process fluid comprises determining a drive gain threshold.

3. The method of claim 2, wherein determining a drive gain threshold comprises measuring drive gain signal over a predetermined time period.

4. The method of claim 1, wherein measuring entrained gas in the process fluid comprises detecting periods of time comprising minimum entrained gas in the process fluid, and wherein the measurement confidence level is lowered if the drive gain threshold during these periods is above a predetermined threshold.

5. The method of claim 4, comprising the step of recording at least one hold value during the periods of time having low to no entrained gas in the process fluid.

6. The method of claim 5, wherein the at least one hold value comprises at least one of a flow rate and a density of the process fluid.

7. The method of claim 1, comprising the steps of:
measuring a flow rate of the process fluid; and
lowering the measurement confidence level if the measured flow rate is below a predetermined threshold.

8. The method of claim 1, comprising the steps of:
measuring a time interval between process fluid entrained gas measurements; and
lowering the measurement confidence level if the time interval is greater than a predetermined amount.

9. The method of claim 1, comprising the steps of:
recording a plurality of hold values; and lowering the measurement confidence level if a standard deviation of the plurality of hold values is greater than a predetermined threshold.

10. Meter electronics (20) for a flowmeter (5) configured to receive a process fluid, the meter electronics (20) comprising an interface (201) configured to communicate with a flowmeter assembly of the flowmeter (5), and receive a vibrational response, and a processing system (203) coupled to the interface (201) comprising:
a measurement confidence routine (215) configured to:
measure an entrained gas in the process fluid; and
determine a measurement confidence level of at least one operating variable, wherein measuring entrained gas in the process fluid comprises detecting a severity of gas slugs in the process fluid, and wherein the measurement confidence level is lowered if the severity of gas slugs is above a predetermined threshold.

11. The meter electronics (20) of claim 10, wherein measuring entrained gas in the process fluid comprises determining a drive gain threshold.

12. The meter electronics (20) of claim 11, wherein determining a drive gain threshold comprises measuring drive gain signal over a predetermined time period.

13. The meter electronics (20) of claim 10, configured to detect periods of time comprising minimum entrained gas in the process fluid, and wherein the measurement confidence level is lowered if the drive gain threshold during these periods is above a predetermined level.

14. The meter electronics (20) of claim 13, wherein the measurement confidence routine is configured to record at least one hold value during the periods of time having low to no entrained gas in the process fluid.

15. The meter electronics (20) of claim 14, wherein the at least one hold value comprises at least one of a flow rate and a density of the process fluid.

16. The meter electronics (20) of claim 10, wherein the measurement confidence routine is configured to:
measure a flow rate of the process fluid; and
lower the measurement confidence level if the measured flow rate is below a predetermined threshold.

17. The meter electronics (20) of claim 10, wherein the measurement confidence routine is configured to:
measure a time interval between process fluid entrained gas measurements; and
lower the measurement confidence level if the time interval is greater than a predetermined amount.

18. The meter electronics (20) of claim 10, wherein the measurement confidence routine is configured to:
record a plurality of hold values; and
lower the measurement confidence level if a standard deviation of the plurality of hold values is greater than a predetermined threshold.

* * * * *

UNITED STATES PATENT AND TRADEMARK OFFICE
CERTIFICATE OF CORRECTION

PATENT NO. : 10,641,633 B2
APPLICATION NO. : 15/548667
DATED : May 5, 2020
INVENTOR(S) : Frederick Scott Schollenberger and Joel Weinstein Page 1 of 1

It is certified that error appears in the above-identified patent and that said Letters Patent is hereby corrected as shown below:

In the Specification

Column 10, Line 51, replace "$\rho_m$" with -- $\rho_{mix}$ --.

Signed and Sealed this
Third Day of November, 2020

Andrei Iancu
*Director of the United States Patent and Trademark Office*